United States Patent [19]

Hahn

[11] Patent Number: 4,585,117
[45] Date of Patent: Apr. 29, 1986

[54] FLIGHT FOR LINK CHAIN CONVEYOR
[75] Inventor: Frederick C. Hahn, Aloha, Oreg.
[73] Assignee: ESCO Corporation, Portland, Oreg.
[21] Appl. No.: 613,889
[22] Filed: May 24, 1984
[51] Int. Cl.$^4$ ............................................. B65G 19/24
[52] U.S. Cl. ................................. 198/731; 198/803.01
[58] Field of Search ............... 198/648, 712, 731, 733, 198/803.01; 403/346, 347, 316, 317, 318

[56] References Cited
U.S. PATENT DOCUMENTS

| | | | |
|---|---|---|---|
| 1,583,614 | 5/1926 | Smith | 198/731 X |
| 1,850,686 | 3/1932 | Pangborn | 198/731 |
| 2,754,957 | 7/1956 | Dodson | 198/731 |
| 3,003,613 | 10/1961 | Meloy | 198/731 |
| 3,246,731 | 4/1966 | I'Anson | 198/731 X |
| 4,335,532 | 6/1982 | Hahn et al. | 37/142 R |

Primary Examiner—Joseph E. Valenza
Assistant Examiner—Lyle Kim
Attorney, Agent, or Firm—Tilton, Fallon, Lungmus & Chestnut

[57] ABSTRACT

A mechanically attached conveyor flight including a generally rectangular elongated metal body having a notch in the top, front and rear walls for the receipt of a chain link, cavity and recess means flanking the link receiving notch for the mounting of a locking plate, threaded lock and keeper for two stage disassembly and flight removal without the need of welding while providing a rugged, reliable installation.

2 Claims, 12 Drawing Figures

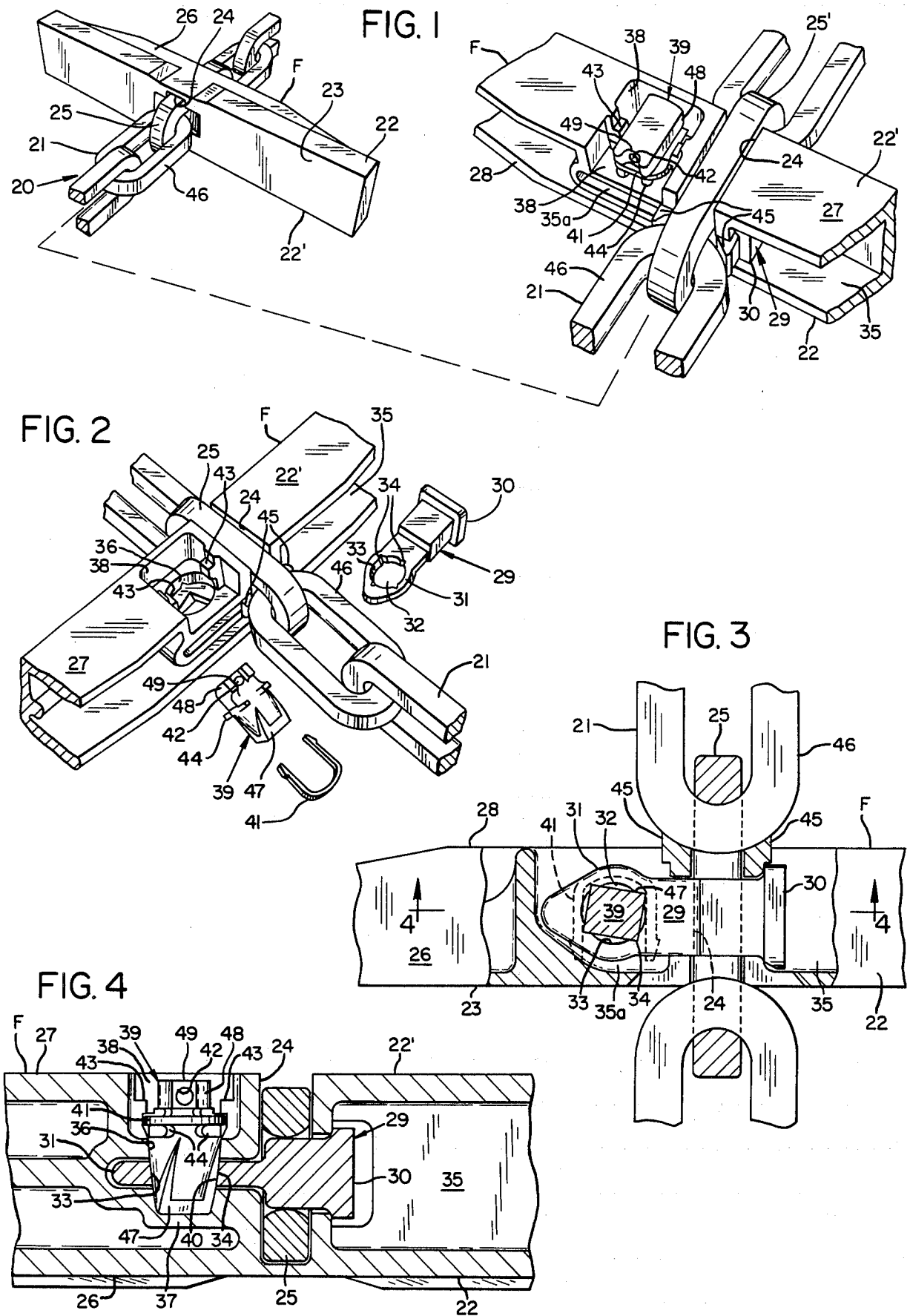

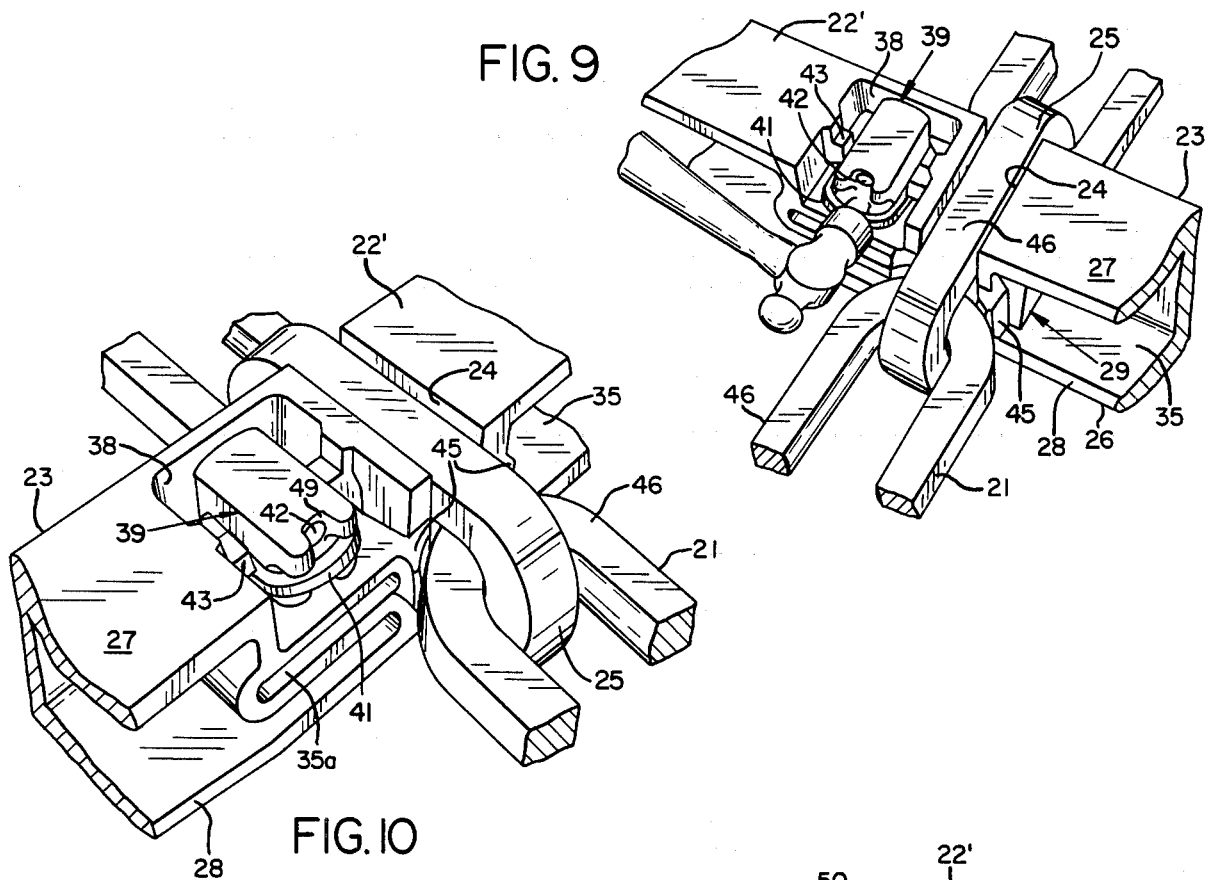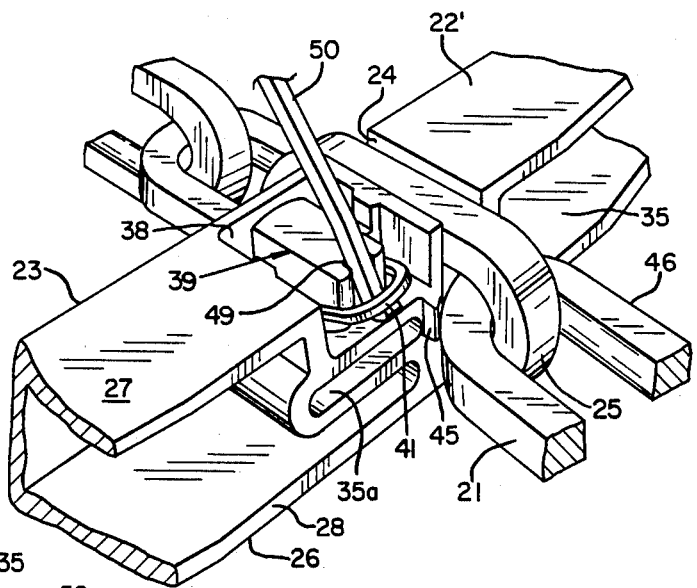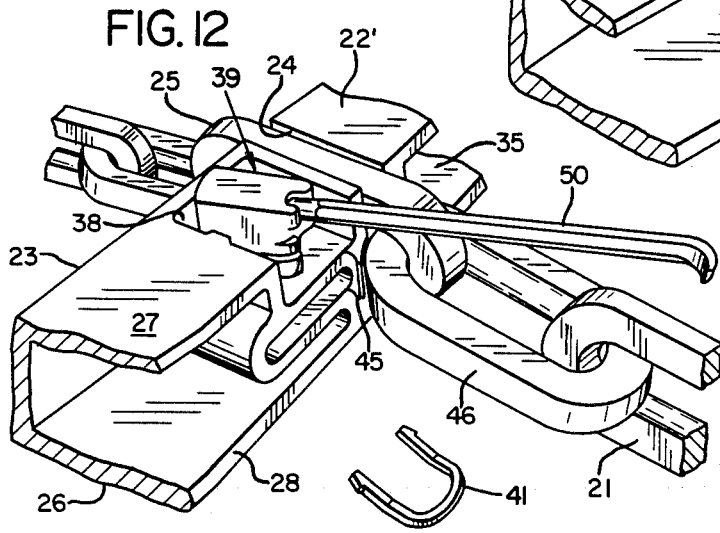

FLIGHT FOR LINK CHAIN CONVEYOR

BACKGROUND AND SUMMARY OF INVENTION

This invention relates to a flight for a link chain conveyor and, more particularly, to a mechanically attached flight.

In specially arduous applications, such as log woodyards, flight equipped conveyors must not only be rugged and reliable but easily repairable. The general operating conditions do not permit the use of complex connections to insure the foregoing requirements. Therefore, one or more have been sacrificed—as where the flight is welded to one of the chain links. This frustrates easy repair and also prevents repositioning of the flight along the length of the chain as circumstances may dictate. This same drawback applies to the many varieties of split link flight connections—see for example, co-owned U.S. Pat. No. 3,712,456.

Attempts have been made in the past to provide mechanically attached fights to ordinary links, such as co-owned U.S. Pat. No. 2,754,957. Such direct and simple connections have been tried for many years—see for example, U.S. Pat. No. 540,617. None of these has succeeded primarily due to severe structural limitations.

In contrast, the invention which makes use of a uniquely attached conveyor flight has operated well past 5000 operating hours on field trial with no operating, structural or mechanical problems.

According to the invention, the flight can be connected to any desired vertical link—it not being necessary to burn the chain links or perform any other welding operation so that the user can change spacings of the flights quickly and economically.

The invention employs cavity means within the flight which receives a locking plate which extends through any predetermined link and is releasably maintained in place by means of a threaded lock received in a recess means communicating with the cavity means. In turn, I provide a keeper means which cooperates with the threaded lock and recess means for releasably maintaining the flight on position on a predetermined link. Thus, there is provided a two-stage unlocking mechanism—but one which is readily performed, even under disadvantageous field conditions. The two stage lock is similar to that I have employed in connection with excavating teeth as represented by co-owned U.S. Pat. No. 4,335,532.

The invention is described in conjunction with the accompanying drawing, in which—

FIG. 1 is a fragmentary, somewhat schematic view of a portion of the conveyor equipped with flights connected to the various links by means of the invention;

FIG. 2 is an exploded perspective view of the various parts of the chain and conveyor flight;

FIG. 3 is a fragmentary top plan view of an assembled flight;

FIG. 4 is an enlarged fragmentary sectional view such as would be seen along the sight line 4—4 of FIG. 3;

FIGS. 5-10 are fragmentary perspective views showing the sequence of installing the locking means for securing the chain flight in place upon a link of a chain conveyor; and FIGS. 11 and 12 are views similar to FIGS. 5-10 but showing the sequence of steps of unlocking the locking device.

DETAILED DESCRIPTION

Figure 5:
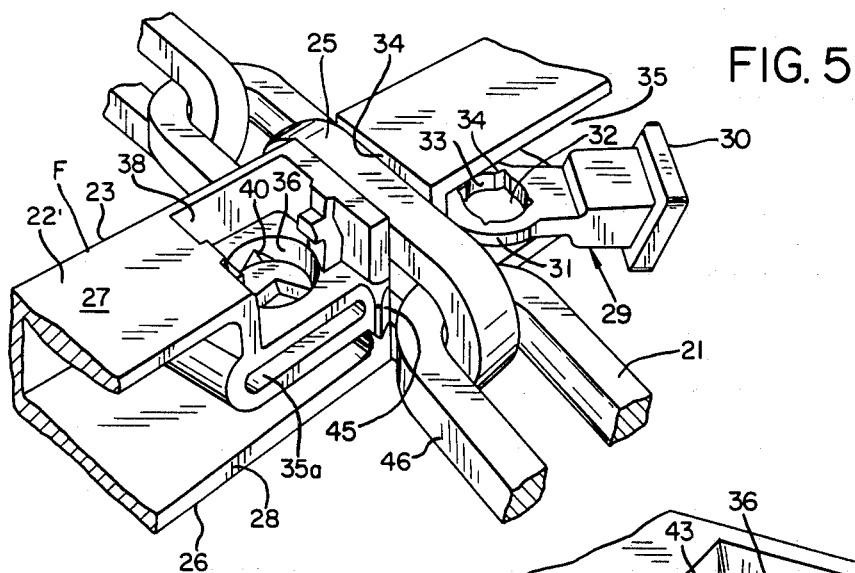

In the illustration given and with reference first to FIG. 1, the numeral 20 designates generally a link chain conveyor including a link chain 21 and flight F having sides 22 and 22'. The flight side 22 is down on the "carry" run while the flight 22' is down on the "return" or non-operating run of the endless chain.

The flight sides 22, 22' are relatively elongated in a direction transverse to the length of travel of the chain 21 and has a working or front face 23. This is flat and uninterrupted except for the notch 24 accommodating the insertion of the mounting link 25—or 25' in the lower portion of FIG. 1.

The flight F is also seen to have a flat, uninterrupted top face or wall 26.

In the lower portion of FIG. 1, the inverted flight side 22' is seen to have a bottom wall 27 and a rear wall or face 28 which is employed for access of certain of the locking parts—see FIG. 5 for example.

These locking parts can be quickly appreciated from the exploded view of FIG. 2 where, in the upper right hand portion the numeral 29 designates generally a locking member or plate. More particularly, the locking plate has a head or block end 30 (see also FIG. 5) and an insertion end 31 equipped with a lock receiving opening 32. The wall 33 defining the opening 32 is equipped with circumferentially spaced threads 34.

After a given chain link 25 (see FIG. 5) has been installed within the notch 24 provided in the flight F, the locking plate 29 is grasped as shown in FIG. 5 and inserted into a cavity 35 within the flight F. When it is fully seated, it occupies the position illustrated in FIG. 6 where the opening 32 is aligned with an opening 36 provided in the bottom wall 37 of a recess 38.

Thereafter a threaded lock generally designated 39 (compare FIGS. 2 and 9) is inserted into the aligned openings 32 and 36 and threadably seated. For this purpose, the wall defining the opening 36 is equipped with circumferentially spaced threads as at 40—see FIG. 6.

Figure 8:
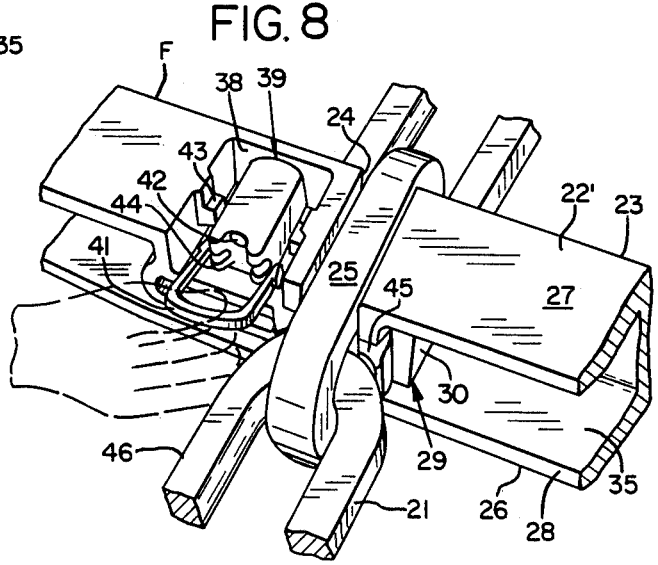

After the threaded lock 39 is fully seated—see FIG. 8—a generally U-shaped keeper 41 is installed and tapped into place (compare FIGS. 8 and 9). The final assembly is illustrated in FIG. 10.

For removal, a pry bar is employed as illustrated in FIG. 11 to remove the keeper 41 and thereafter the pointed end of the pry bar can be inserted into a cored opening 42 (see FIG. 2) to unscrew the threaded lock 39.

Flight Construction

As mentioned previously, the flight is a generally rectangular, relatively elongated body of metal—such as alloy steel having a flat, uninterrupted top wall 26. The three remaining walls are interrupted at least to provide the notch 24 for the link 25. For example, in the upper part of FIG. 1, the front wall 23 is interrupted as at 24 for this purpose. So also is the rear wall 28 as can be appreciated from the lower part of FIG. 1. The bottom wall 27 is likewise interrupted—still referring to the bottom portion of FIG. 1 and additionally, is interrupted for the recess 38.

Figure 7:
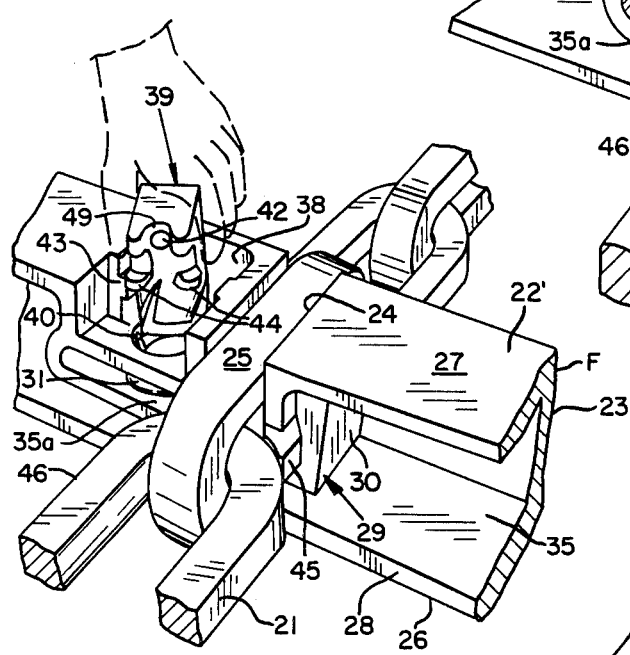

Additionally, the rear wall 28 is interrupted as at 35—still referring to FIG. 1 and in the lower portion thereof—to provide the cavity 35 for insertion of the lock plate 29. In FIG. 3, the right hand cavity 35 is seen to accommodate the head or block portion 30 of the locking plate 29. The cavity 35 communicates with the notch 24 and the also left hand cavity 35a (see FIG. 7) which accommodates the portion of the lock plate 29 which includes the threaded opening 32. As can be best appreciated from a consideration of FIG. 5, the portion 35a (see the lower left hand portion of FIG. 5) opens into the rear wall 28—this for ease in casting and also, if necessary, to assist in prying out the locking plate 29 after the lock 39 has been removed.

Figure 6:
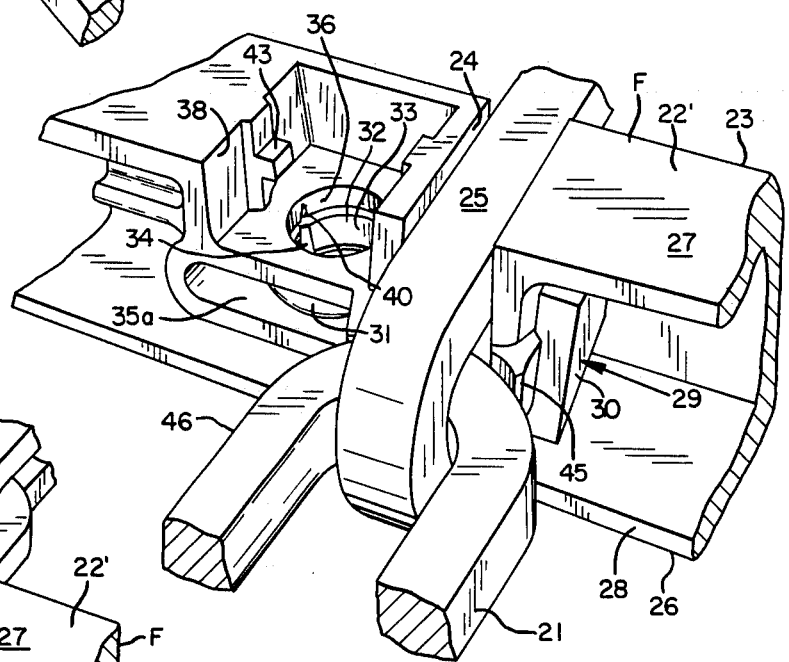

Referring to FIG. 6, the recess 38 is seen to be equipped with integral lugs 43 which cooperate with alignable lugs 44 provided on the threaded lock 39—see FIG. 2 and compare with FIGS. 9 and 10.

Still further, the flight 22 is equipped with contoured shoulders 45 (compare FIGS. 3 and 9) which are shaped to the end of the trailing link and thereby avoids localized stresses. It is the link 46 (see FIG. 3) which bears against the flight during conveyor operation and thus a broad area is provided for this bearing.

Threaded Lock

The threaded lock 39 has a threaded shank portion as at 47 (see FIG. 4) and an upper keeper retaining portion 48. Provided in this portion 48 is the notch 49 which cooperates with the pry bar 50 (also see FIGS. 10 and 11).

While in the foregoing specification a detailed description of an embodiment of the invention has been set down for the purpose of illustration, many variations in the details hereingiven may be made by those skilled in the art without departing from the spirit and scope of the invention.

I claim:

1. A chain-flight construction comprising an elongated chain having a plurality of identical, generally oval, interconnected links, a flight including a unitary elongated body having top and bottom sides and front and rear faces, a notch in said body extending from the front to the rear face and being open to one of said top and bottom sides for the receipt of one of said links, one of said links being positioned in said notch, said body being equipped with transverse walls defining the sides of said notch, openings in said notch side walls for the mounting of a lock to releasably maintain a link in said notch, a cavity in said body adjacent each notch side wall and a headed locking member extending through said notch sidewall openings from one cavity to the other with the head of the locking member being in one cavity and the member extending into the other cavity and passing through the notch-positioned link, and temporary locking means in the other cavity on the end of said locking member opposite to the head end.

2. The structure of claim 1 in which said temporary locking means includes a threaded lock equipped with keeper means.

* * * * *